(12) United States Patent
Bornegard

(10) Patent No.: US 10,035,207 B2
(45) Date of Patent: Jul. 31, 2018

(54) METHOD OF BRAZING A PLATE HEAT EXCHANGER USING SCREEN PRINTED BRAZING MATERIAL; A PLATE HEAT EXCHANGER MANUFACTURING BY SUCH METHOD

(71) Applicant: SWEP International AB, Landkrona (SE)

(72) Inventor: Niclas Bornegard, Bjarred (SE)

(73) Assignee: SWEP INTERNATIONAL AB, Landskrona (SE)

( * ) Notice: Subject to any disclaimer, the term of this patent is extended or adjusted under 35 U.S.C. 154(b) by 0 days.

(21) Appl. No.: 15/032,471

(22) PCT Filed: Oct. 24, 2014

(86) PCT No.: PCT/EP2014/072904
§ 371 (c)(1),
(2) Date: Apr. 27, 2016

(87) PCT Pub. No.: WO2015/062992
PCT Pub. Date: May 7, 2015

(65) Prior Publication Data
US 2016/0250703 A1   Sep. 1, 2016

(30) Foreign Application Priority Data

Oct. 29, 2013   (SE) ...................................... 1351284

(51) Int. Cl.
*B23K 31/02*   (2006.01)
*B23K 1/00*   (2006.01)
(Continued)

(52) U.S. Cl.
CPC ............ *B23K 1/0012* (2013.01); *B23K 1/008* (2013.01); *B23K 1/19* (2013.01); *F28D 9/005* (2013.01);
(Continued)

(58) Field of Classification Search
CPC .... B23K 1/0012; B23K 2201/14; B23K 1/19; B23K 1/008; F28F 21/083; F28F 3/086;
(Continued)

(56) References Cited

U.S. PATENT DOCUMENTS

| 5,223,619 A | 6/1993 | Frei et al. |
| 6,574,427 B1 * | 6/2003 | Andersson .............. F24D 3/087 165/164 |

(Continued)

FOREIGN PATENT DOCUMENTS

| CN | 1507379 A | 6/2004 |
| EP | 2267391 A2 * | 12/2010 |

(Continued)

OTHER PUBLICATIONS

Written Opinion for International Application No. PCT/EP2014/072904, dated Mar. 10, 2015 (5 pages).
(Continued)

*Primary Examiner* — Kiley Stoner
(74) *Attorney, Agent, or Firm* — Merchant & Gould P.C.

(57) ABSTRACT

A method for brazing a plate heat exchanger comprising a stack of heat exchanger plates (110,115) is provided with a pressed pattern of ridges (R) and grooves (G) adapted to form contact points between the plates (110, 115) and provide for interplate flow channels for media to exchange heat is provided. The interplate flow channels are in selective fluid communications with port openings (120, 130, 140, 150) provided near corners of the heat exchanger plates (110, 115). The method comprises the following steps:
  calculating or measuring the exact position of all contact points between the ridges (R) and grooves (G) of the neighboring plates (110, 115);
  applying brazing material (B) close to, but not at, the contact points;

(Continued)

stacking heat exchanger plates (110, 115) provided with brazing material to a stack;

placing the stack of heat exchanger plates (110, 115) in a furnace;

heating the stack of heat exchanger plates (110, 115) to a temperature sufficient for melting the brazing material (B); and allowing the stack of heat exchanger plates (110, 115) to cool down such that the brazing material (B) solidifies and binds the plates (110, 115) together.

13 Claims, 4 Drawing Sheets

(51) Int. Cl.
| | | |
|---|---|---|
| *F28F 3/04* | (2006.01) | |
| *F28D 9/00* | (2006.01) | |
| *B23K 1/008* | (2006.01) | |
| *B23K 1/19* | (2006.01) | |
| *F28F 21/08* | (2006.01) | |
| *F28F 3/08* | (2006.01) | |
| *B23K 101/14* | (2006.01) | |

(52) U.S. Cl.
CPC .............. *F28F 3/046* (2013.01); *F28F 3/086* (2013.01); *F28F 21/083* (2013.01); *B23K 2201/14* (2013.01); *F28F 3/08* (2013.01); *F28F 2275/045* (2013.01)

(58) Field of Classification Search
CPC ........ F28F 3/046; F28F 2275/045; F28F 3/08; F28D 9/005
USPC .......................................... 228/183, 245–262
See application file for complete search history.

(56) References Cited

U.S. PATENT DOCUMENTS

| | | | | |
|---|---|---|---|---|
| 6,843,311 B2* | 1/2005 | Evans | ..................... | F28D 9/005 165/109.1 |
| 9,103,597 B2* | 8/2015 | Christensen | ............ | F28D 9/005 |
| 2001/0030043 A1* | 10/2001 | Gleisle | ................. | B23K 1/0012 165/167 |
| 2002/0050347 A1* | 5/2002 | Hainley | ................... | F28D 9/005 165/167 |
| 2003/0102107 A1* | 6/2003 | Nilsson | ................... | F24H 1/121 165/70 |
| 2004/0069837 A1* | 4/2004 | Fujiyama | ............... | B21D 53/04 228/183 |
| 2004/0181941 A1 | 9/2004 | Rassmus et al. | | |
| 2004/0182555 A1* | 9/2004 | Lagerstrom | ........... | F28D 9/0031 165/166 |
| 2004/0241060 A1* | 12/2004 | Silversand | ........ | H01M 8/04074 422/198 |
| 2005/0103087 A1* | 5/2005 | Kawasaki | ............... | B21D 13/08 72/381 |
| 2005/0161494 A1* | 7/2005 | Matsu | ................... | B23K 1/0012 228/183 |
| 2005/0178536 A1* | 8/2005 | Blomgren | ............... | B21D 53/04 165/167 |
| 2007/0089871 A1* | 4/2007 | Andersson | .............. | F28D 9/005 165/167 |
| 2008/0029257 A1* | 2/2008 | Nilsson | ..................... | F28F 3/04 165/167 |
| 2008/0190595 A1* | 8/2008 | Sjodin | .................. | B23K 1/0012 165/167 |
| 2008/0196874 A1* | 8/2008 | Bertilsson | ............... | F28D 9/005 165/167 |
| 2008/0210414 A1* | 9/2008 | Blomgren | ............... | F28D 9/005 165/166 |
| 2009/0008073 A1* | 1/2009 | Larsson | ................... | F28F 3/046 165/168 |
| 2010/0006275 A1* | 1/2010 | Arvidsson | ............... | F28D 9/005 165/170 |
| 2010/0140227 A1 | 6/2010 | Berges | | |
| 2010/0258288 A1 | 10/2010 | Krantz et al. | | |
| 2011/0088882 A1* | 4/2011 | Persson | ................... | F28D 9/005 165/167 |
| 2011/0290461 A1* | 12/2011 | Andersson | .............. | F28D 9/005 165/170 |
| 2011/0290462 A1* | 12/2011 | Andersson | .............. | F28D 9/005 165/170 |
| 2011/0308779 A1* | 12/2011 | Andersson | .............. | F28D 9/005 165/170 |
| 2012/0118546 A1* | 5/2012 | Andersson | .............. | F28D 9/005 165/170 |
| 2013/0126135 A1* | 5/2013 | Romlund | ................ | F28D 9/005 165/133 |
| 2013/0180699 A1* | 7/2013 | Dahlberg | .............. | F28D 9/0031 165/185 |
| 2014/0231055 A1* | 8/2014 | Schalansky | ............ | F28F 3/086 165/166 |
| 2014/0360224 A1* | 12/2014 | Barone | ................. | F25B 39/022 62/515 |
| 2015/0083379 A1* | 3/2015 | Ito | ............................. | F28F 9/00 165/166 |
| 2015/0276319 A1* | 10/2015 | Hedberg | ................. | F28F 3/046 165/166 |
| 2015/0292803 A1* | 10/2015 | Nyander | .................... | F28F 3/10 165/166 |
| 2015/0300743 A1* | 10/2015 | Persson | ................... | F28D 9/005 165/166 |
| 2015/0362269 A1* | 12/2015 | Andersson | ............ | F25B 39/022 165/166 |
| 2016/0175990 A1* | 6/2016 | Sjodin | ................... | B23K 35/30 428/450 |
| 2016/0187076 A1* | 6/2016 | Blomgren | ............... | F28D 9/0012 165/80.1 |
| 2016/0313071 A1* | 10/2016 | Andersson | .............. | F28F 3/044 |

FOREIGN PATENT DOCUMENTS

| | | | | |
|---|---|---|---|---|
| EP | 2370774 A1 * | 10/2011 | ............. | F28D 9/005 |
| JP | H09 178384 | 7/1997 | | |
| JP | 2000337789 A * | 12/2000 | ............. | F28D 9/005 |
| WO | WO 0116544 A1 * | 3/2001 | ............ | B23K 1/0012 |

OTHER PUBLICATIONS

International Search Report for International Application No. PCT/EP2014/072904, dated Oct. 3, 2015 (2 pages).

* cited by examiner

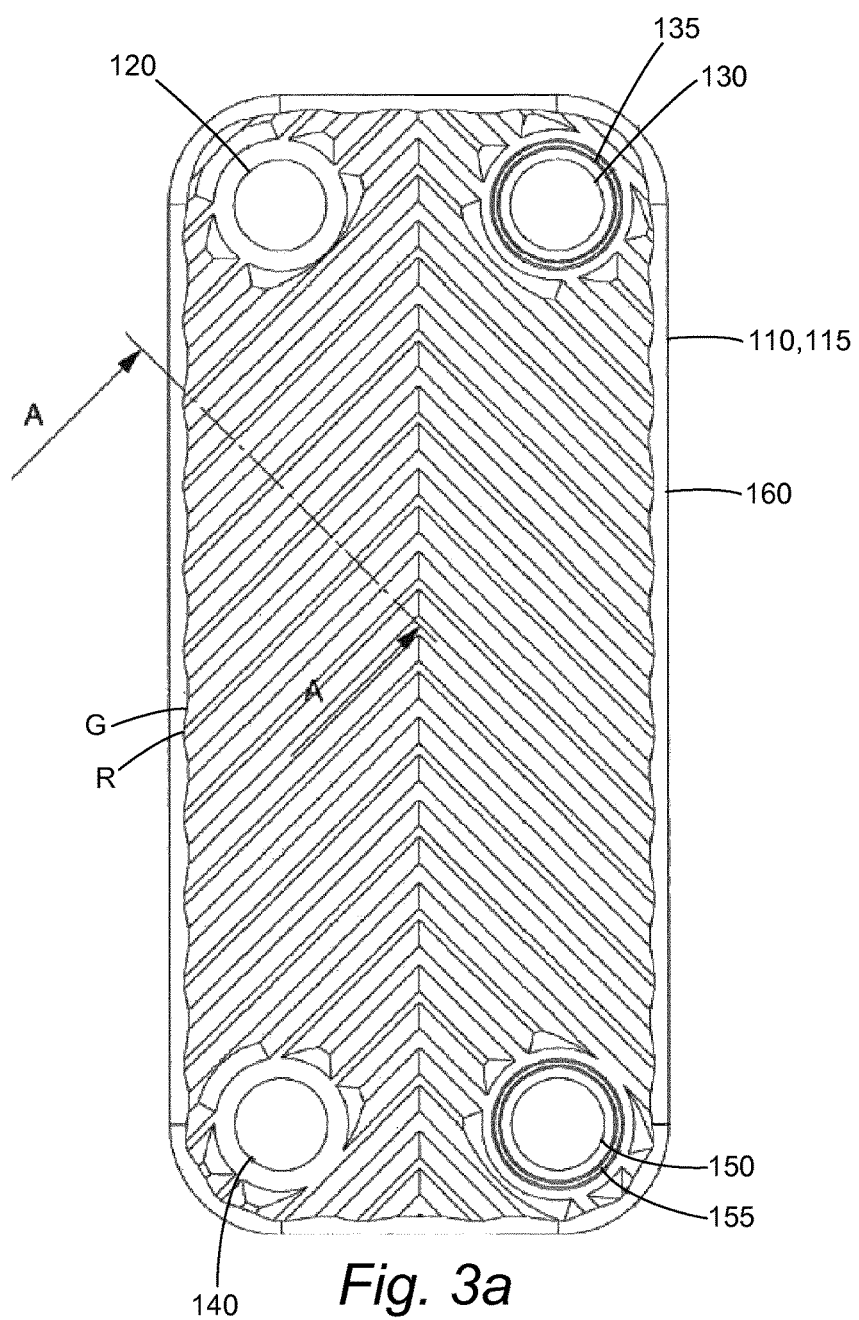
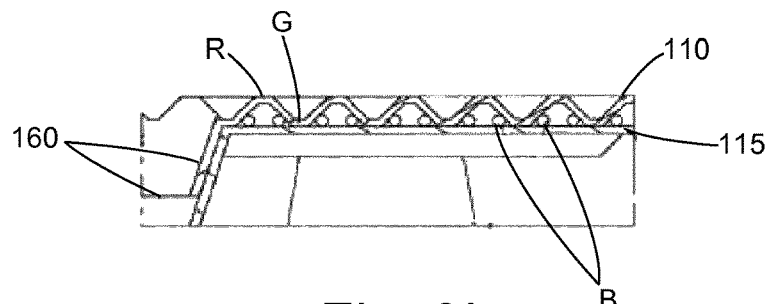
Fig. 3a
Fig. 3b

METHOD OF BRAZING A PLATE HEAT EXCHANGER USING SCREEN PRINTED BRAZING MATERIAL; A PLATE HEAT EXCHANGER MANUFACTURING BY SUCH METHOD

This application is a National Stage Application of PT/EP2014/072904, filed 24 Oct. 2014, which claims benefit of Application Serial No. 1351284-3, filed 29 Oct. 2013 in Sweden, and which applications are incorporated herein by reference. To the extent appropriate, a claim of priority is made to each of the above disclosed applications.

FIELD OF THE INVENTION

The present invention relates to a method for brazing a plate heat exchanger comprising a stack of heat exchanger plates provided with a pressed pattern of ridges and grooves adapted to form contact points between the plates and provide for interplate flow channels for media to exchange heat, said interplate flow channels being in selective fluid communications with port openings provided near corners of the heat exchanger plates, the method including the steps of:

i. calculating or measuring the exact position of all contact points between the ridges and grooves of the neighboring plates;

ii. applying brazing material close to, but not at, the contact points; stacking heat exchanger plates provided with brazing material to a stack;

iii. placing the stack of heat exchanger plates in a furnace;

iv. heating the stack of heat exchanger plates to a temperature sufficient for melting the brazing material (B); and v. allowing the stack of heat exchanger plates to cool down such that the brazing material solidifies and binds the plates together.

The invention also relates to a brazed heat exchanger comprising a number of heat exchanger plates provided with a pressed pattern of ridges and grooves for providing contact points between the heat exchanger plates while keeping the plates on a distance from one another under formation of interplate flow channels for media to exchange heat, wherein port openings are provided for selective fluid communication with the interplate flow channels.

PRIOR ART

It has been known for a long time to braze plate heat exchangers. Usually, a brazing material is placed between plates of a stack of heat exchanger plates provided with a pressed pattern of ridges and grooves holding the plates on a distance from one another under formation of interplate flow channels to exchange heat. The stack of plates is then placed in a furnace which is heated to a temperature above the melting temperature of the brazing material. The brazing material is due to capillary forces concentrated to the contact points between the ridges and grooves of the neighboring plates.

After the heating in the furnace, the temperature is lowered, such that the brazing material solidifies, hence fastening the plates to one another.

The heat exchanger plates are often made from stainless steel, and the brazing material may be any metal or alloy having a melting point below the melting point of the stainless steel; copper is one material that is often used for the brazing of stainless steel, but it is also possible to use e.g. nickel or iron based brazing material having additions of e.g. silicon (Si), phosphor (P), copper (Cu), boron (B) or combinations thereof to depress the melting temperature.

It has been found that the strength of a brazed plate heat exchanger often exceeds the theoretical strength considering the material and section of the brazing points. Cutting and microscoping of the brazing points can explain this discrepancy between theoretical and actual strength: a significant portion of the strength emanates from diffusion bonding of the stainless steels of neighbouring plates. By diffusion bonding is meant that a part of the joint between the ridges and grooves of the neighboring plates consists of the base material of the neighboring plates, i.e. not the brazing material. The borderline between diffusion bonding and brazing is not sharp; if the crevice that is filled with brazing material is very thin, a large percentage of the brazing material will diffuse into the material of the articles to be brazed, hence leaving a joint having a large percentage of base material, i.e. the material from which the articles to be joined are manufactured.

The brazing material is often provided in form of a thin sheet metal (in the case of copper, the sheet metal thickness is often about 50 μm), but in the case of other brazing materials, the brazing material is often applied in form of a paste, which comprises the brazing material in form of a metal powder and a binder for making the paste. Such a brazing method is disclosed in U.S. Pat. No. 7,685,716. According to one embodiment disclosed in this document, the brazing material is provided in a ring surrounding contact points between ridges and grooves of neighboring heat exchanger plates. According to this document, it is sufficient to cover only 5-40% of the area with brazing material.

Generally speaking, finely atomized metal powders are expensive, and due to the large exposed area/weight unit they are sensitive to surface corrosion. Therefore, it is common to use a grain size of 50-100 μm for the brazing material particles in the brazing material paste.

Usually, brazing material paste is applied to the areas to be brazed only. However, this may lead to problems with large crevices between the objects to be brazed, since brazing material particles will be trapped between the objects to be brazed. This effect is less pronounced in copper brazing as compared to welding with e.g. iron based brazing materials, since copper is a ductile material having a well defined melting point, meaning that the objects to be brazed will come closer to one another once the brazing material has melted, hence reducing the distance, i.e. the crevice, between the objects.

Iron based brazing materials do not have a well defined melting point—rather, they have a melting temperature interval, i.e. some constituents start to melt at a low temperature and some constituents melt at a higher temperature. Tests have shown that the brazing joints exhibit some disadvantageous properties due to the large crevices.

The large crevices are also disadvantageous in that a large amount of brazing material is required to fill the crevice with a brazing material. In the case of an iron-based brazing material, excessive amounts of brazing material may lead to melt-through of the material from which the heat exchanger plate are manufactured.

US 2010/0258288 discloses brazing of heat exchanger plates, more specifically brazing of edge portions of heat exchanger plates. The invention concerns provision of a "pocket" in which superfluous brazing material may be gathered.

It is the object of the present invention to provide a method for decreasing the crevices during brazing with brazing material pastes, such that stronger brazing joints may be formed with less brazing material.

Another object of the invention is to provide a heat exchanger manufactured by the method according to the invention.

SUMMARY OF THE INVENTION

The above and other problems are solved by a brazing method wherein the step of applying brazing material close to, but not at, the contact points includes screen printing the brazing material in half moon shaped, donut-shaped or ( )-shaped patterns neighboring the contact point.

In order to secure a liquid tight circumferential portion, the method may further include the step of applying brazing material on skirts surrounding the heat exchanger plates and areas around the port openings that should be joined.

In order to enable close contact between areas around the port openings of neighboring plates, the brazing material may be applied in at least one minute groove extending around said port opening.

In order to ensure proper coating of the brazing material, the brazing material may be applied in the form of a paste.

In order to provide a heat exchanger mainly consisting of stainless steel, the brazing material maybe an iron based brazing material containing a base of stainless steel and additives of melting point depressants, e.g. silicon, boron and/or phosphorus.

If cost is not that much of an issue, the brazing material may be a nickel based brazing material.

If cost and resistance against e.g. ammoniac is not an issue, the brazing material may be a copper based brazing material.

In order to ensure capillary suction forces moving the brazing material into the crevice or gap neighboring the contact points, the brazing material may be placed such that it is in contact with both the ridges of the pressed pattern of one plate and the grooves of the pressed pattern of a neighboring plate.

In order to provide for an economic production process, the brazing material may be placed on one side of the contact point only.

In order to break oxide layers of the plates to be brazed, a flux may be provided at the contact points between the neighboring plates.

In order to break the oxide layer of the plates to be joined and ensuring proper wetting between the brazing material and the material to be brazed, the brazing operation may be performed under a vacuum, a reducing or a protective atmosphere.

In order to allow for an as close contact as possible between the heat exchanger plates to be brazed, the brazing material may be applied only to areas in which a gap having the height h between the groove of an upper heat exchanger plate and the ridge of a lower heat exchanger plate is larger than the grains of the brazing material.

According to the above method, it is possible to apply brazing material to a surface corresponding to less than 5% of the entire surface of the heat exchanger plate.

The method according to the above may preferably be used for brazing a brazed heat exchanger comprising a number heat exchanger plates provided with a pressed pattern of ridges and grooves for providing contact points between the heat exchanger plates while keeping the plates on a distance from one another under formation of interplate flow channels for media to exchange heat, wherein port openings are provided for selective fluid communication with the interplate flow channels.

BRIEF DESCRIPTION OF THE DRAWINGS

In the following, the invention will be described with reference to the appended drawings, wherein:

FIG. 3a is a top view showing the two heat exchanger plates of FIG. 1; and

FIG. 3b is a section view showing a section along the line A-A in FIG. 3a, and

DESCRIPTION OF EMBODIMENTS

Brazed plate heat exchangers generally comprise a number of heat exchanger plates provided with a pressed pattern of ridges R and grooves G adapted to keep the plates on a distance from one another under formation of interplate flow channels for media to exchange heat. Port openings are provided, usually near the corners of the heat exchanger plates, wherein the port openings are in selective communication with the interplate flow channels. The selective communication is usually achieved by providing areas surrounding the port openings on different levels, such that the areas around the port openings of neighboring plates either contact one another to seal the port opening from communication with that particular interplate flow channel or are not contacting one another, such that there will be a fluid connection between the port opening and the interplate flow channel.

Figure 1:
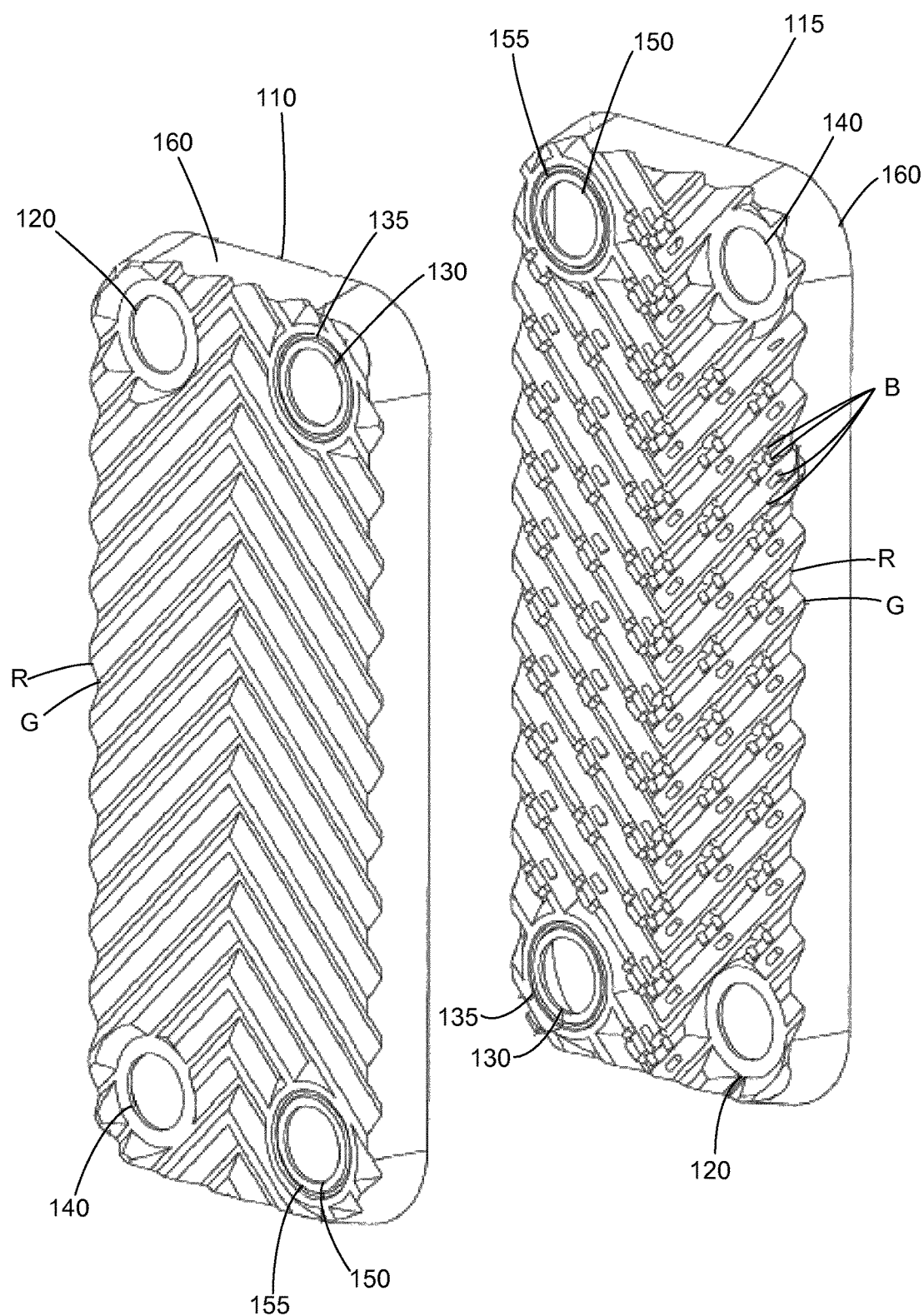
FIG. 1 is a schematic perspective view showing two heat exchanger plates comprised in a heat exchanger manufactured by a method according to the present invention.

With reference to FIG. 1, two heat exchanger plates 110, 115 comprised in a heat exchanger 100 (not shown) are shown. Each of the heat exchanger plates 110 comprises four port openings 120, 130, 140, 150, wherein the areas surrounding the port openings 120, 140 are provided on a low level and the areas surrounding the port openings 130, 150 are provided on a high level. Circular tracks 135, 155 are provided around the port openings being surrounded with areas being arranged to contact areas surrounding port openings of neighboring plates. As can be seen in FIG. 1, one of the heat exchanger plates is turned 180 degrees in its plane as compared to the other plate, meaning that the areas surrounding the port openings 120 and 140 of the plate 110 will contact the areas surrounding the port openings 150 and 130 of the plate 115 when the heat exchanger plates 110, 115 are placed in a stack to be brazed into a heat exchanger. Hence, there will be no communication between the port opening 120 of the plate 110 and an interplate flow channel formed by the plates 110 and 115.

However, the areas surrounding the port openings 130 and 150 of the heat exchanger plate 110 will not come into contact with the areas surrounding the port openings 140 and 120 of the heat exchanger plate 115, hence allowing for a fluid communication between the port openings 130 and 150 of the plate 110 via the interplate flow channel formed by the heat exchanger plates 110, 115.

It should be noted that the heat exchanger plates 110 and 115 may be of the same design. However, by providing heat exchangers Both heat exchanger plates 110, 115 are provided with a pressed herringbone pattern comprising the ridges R and grooves G. The herringbone patterns of the plates serve to form the interplate flow channels by the ridges R of the plate 115 contacting the grooves G of the plate 110, hence forming contact points having a shape given by the Hertzian contact mechanics. The contact points also serve as brazing points holding the plates together. It should be noted that the ridges and grooves shown in FIG. 1 are shown as having flat tops and bottoms, respectively. In reality, however, the tops and bottoms may be either rounded or have flat tops and bottoms.

Figure 2:
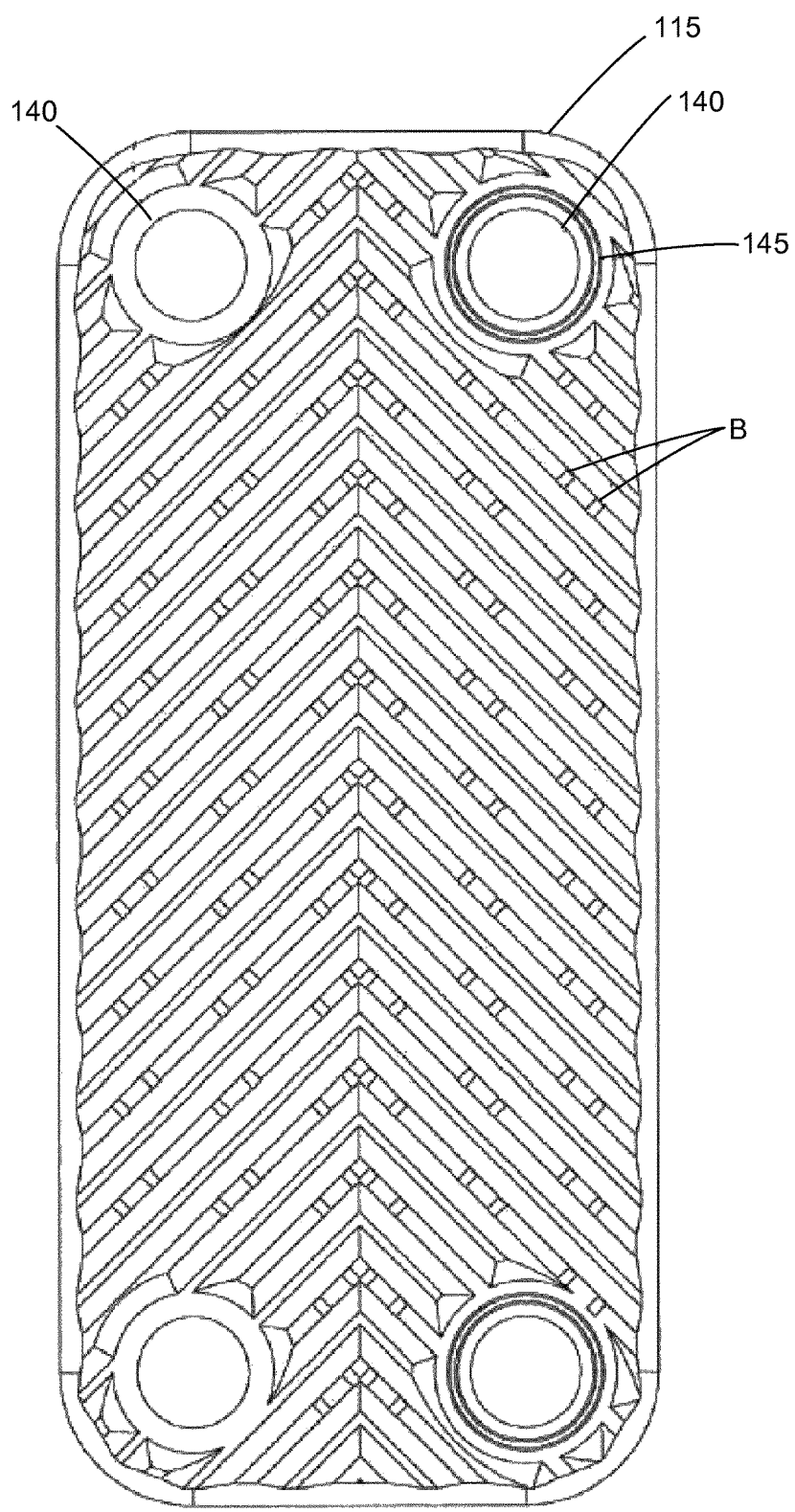
FIG. 2 is a top view of one of the heat exchanger plates of FIG. 1 showing an alternative brazing material application pattern.

In FIG. 2, an exemplary application pattern of brazing material of one plate is shown more clearly. As can be seen, the tops of ridges R are provided with brazing material on either sides of contact points between the ridges and grooves of neighbouring plates. As is obvious, the brazing material coating has a certain thickness, and close to the contact points, the brazing material may come in contact with both the ridge of the plate on which the brazing material is provided and the groove of the neighboring plate.

It should be noted that the embodiment of FIG. 2 is exemplary. In reality, it has been found that the brazing material preferably may be provided in two half moon shapes on both sides of the contact point, wherein the inner circle of the half moon shape faces the contact point. Half moon shapes are generally identical to the shape of parentheses or donuts.

Moreover, the heat exchanger plates comprises a skirt 160 extending around the periphery of the plate and being arranged to provide a contact with skirts of neighboring plates in order to provide for a sealing of the interplate flow channels formed by neighboring plates. The skirts 160 are also provided with a brazing material, such that the skirts of neighbouring plates will be brazed together during a subsequent brazing operation.

As implied above, the heat exchanger plates 110, 115 are part of a heat exchanger comprising several heat exchanger plates (at least three, usually ten to one hundred). The heat exchanger plates are brazed together in a process to be described below.

In a first manufacturing step, the position and/or shape of contact points between the ridges and grooves of neighboring plates are calculated.

In a second step, brazing material B is applied on the areas surrounding the port openings to be brazed to one another (in the case of FIG. 1, the areas surrounding the port openings 150 and 130). In one embodiment of the invention, the brazing material is applied into the circular tracks 135, 155 in the area surrounding the port opening to be brazed. Moreover, brazing material is applied to portions of the ridges R; the portions to which brazing material is applied are in the vicinity of, but not at, the crossing point between the ridges R of the plate 115 and the grooves G of the plate 110. In this context, "at" means that the brazing material is placed such that the brazing material will keep the ridge R and the groove G of neighboring plates on a distance from one another, i.e. such that the distance between the neighboring plates is smaller than the grain size of the brazing material paste. In both FIGS. 1 and 2, the applied brazing material is shown as small cylinders B, but the brazing material may be provided in any shape in the vicinity of, but not at, the crossing points In a third step, brazing material is applied to the skirt 160.

In a fourth step, a desired number of heat exchanger plates are placed in a stack, wherein brazing material according to the second, third and fourth steps are provided between each stacked heat exchanger plate.

In a fifth step, the stack of heat exchanger plates are placed in a furnace, usually in an atmosphere free from oxygen, wherein the stack of heat exchanger plates is heated sufficiently to melt the brazing material, hence forming a brazed heat exchanger.

In a sixth step, the stack of heat exchanger plates is allowed to cool down, such that the brazing material solidifies in order to keep the plates together and seal the areas surrounding the port openings and the engaging skirts 160 of neighboring plates.

In FIG. 2, the application pattern of brazing material is shown more clearly.

It should also be noted that the application of brazing material to the areas surrounding the port openings may be achieved by filling one or more minute grooves being pressed into the area surrounding the port opening. The one or more minute grooves are preferably encircling the port opening, and if more than one groove is provided, one of the grooves may be provided outside the other.

It should be noted that in order to manufacture a heat exchanger, more components than the above are needed; for example, there could be a need for a start plate, which may be identical to the heat exchanger plates but not provided with port openings, and an end plate, which may be similar to the heat exchanger plates but have an entire area close to the port openings provided in the same plane. Start and end plates and their design are well known by persons skilled in the art and are therefore not more thoroughly described.

The invention resides in a method for decreasing the crevices between the plates by not providing any brazing material in the contact points. It has namely been found that the provision of brazing material in the contact points will keep the ridges and grooves of the neighboring plates on a distance from one another at least until the brazing material has melted completely. The problem is that once the brazing material has melted completely, some of the brazing material has been dissolved into the sheet metal from which the heat exchanger plates have been manufactured, hence reducing the amount of brazing material usable for creating a strong joint.

So, instead of providing the contact point with brazing material, as was the case with the prior art brazing, the brazing material is provided just beside the contact point.

Another reason that the brazing joints may be stronger may be diffusion bonding. In theory, diffusion bonding involves no liquid fusion or filler metal; however, in the present case, it might be that once the brazing material starts to melt (which in the case of a single metal brazing material occurs at a certain temperature and in the case of an alloy at a temperature interval), the melted brazing material will be sucked into the very narrow crevice that is inevitably formed between two metal surfaces due to material roughness by capillary forces. Once in the extremely narrow crevice, the melted brazing material will start to dissolve into the sheet metal from which the heat exchanger plates is manufactured, in effect leaving a brazing joint more or less being of the same material as the material from which the heat exchanger plates are manufactured. This is not a "pure" diffusion bonding, but it comes rather close.

In one embodiment of the invention, the brazing material is placed such that the brazing material will contact both of the neighboring plates. This is beneficial in that the brazing material will start to get drawn into the slot or crevice surrounding the diffusion bonding portion of the contact between the ridges and grooves of the neighboring plates by capillary forces.

An example of this is shown in FIGS. 3a and 3b. In FIG. 3a, the heat exchanger plates 110, 115 is shown, and in FIG. 3b, a section along a line A-A is shown.

As can be seen in FIG. 3b, the brazing material B is applied on the tops of the ridges R of the plate 115, but they are in contact with sides of the grooves G of the plate 110. This contact has the effect that there will be an immediate capillary action on the brazing material to be drawn by capillary forces into the crevice between the ridge R of the plate 115 and the groove G of the plate 110. In another embodiment, shown in FIG. 1, brazing material is provided both on the tops of the ridges R and on the flanks thereof; this may seem awkward at a first glance, but it actually makes sense—by providing brazing materials on the flanks of the ridges R, it is possible to surround the contact points between the crossing ridges and grooves of neighboring plates with brazing material all around the contact point. Moreover, if the brazing material is provided close enough to the top of the ridge R, it is possible to realize a contact between the brazing material B, the plate 110 and the plate 115.

Figure 4:
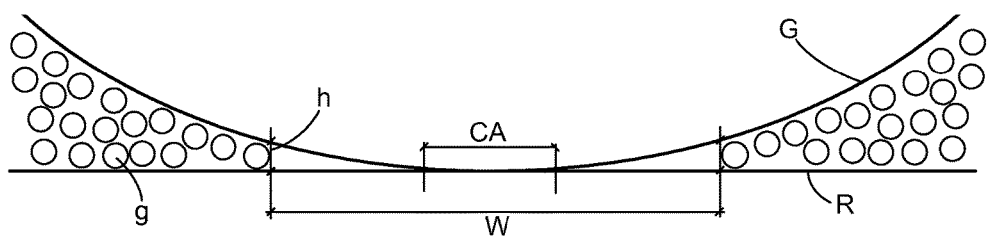
FIG. 4 is a section view showing an exemplary application of brazing material on one of two neighboring heat exchanger plates.

In FIG. 4, another feature of the present invention is shown in detail. FIG. 4 is an exemplary section view of the contact between a groove G of an upper heat exchanger plate and a ridge R of a lower heat exchanger plate, taken along the line A-A of FIG. 3a.

As can be seen in FIG. 4 the contact point between the a groove G of an upper heat exchanger plate and a ridge R of a lower heat exchanger plate is actually an area, denoted CA, the shape of which being given by the Hertzian contact equations, in which area CA the groove G of an upper heat exchanger plate and the ridge R of a lower heat exchanger plate actually will contact one another. In this context, "contact" is defined as a contact without any clearance between the parts, except for unavoidable clearances formed by dirt, oxide layers and the like. The contact area will be surrounded by a narrowing gap having a height h which depends on the distance from the contact area CA. Close to the contact area, the height h will increase virtually linearly with the distance from the contact area, and according to the invention, brazing material will only be applied to areas neighboring the contact area, but not closer than the eight h being larger than a grain size of the brazing material B. By respecting this limit for how close to the contact area the brazing material may be applied, it can be secured that the brazing material does not interfere with the contact areas. It can also be assured that the brazing material does not hinder the groove G of an upper heat exchanger plate and the ridge R of a lower heat exchanger plate will contact one another at an as large contact area as possible.

In FIG. 4, the area in which no brazing material shall be applied is denoted W. This area corresponds, as mentioned above, to the area in which the gap having the height h between the groove G of an upper heat exchanger plate and ridge R of a lower heat exchanger plate is smaller than the grains g of the brazing material B.

In a preferred embodiment of the invention, the brazing material B is applied in the shape of two donuts, two half moons or two parenthese signs partly surrounding the contact point within the limits disclosed above in conjunction to FIG. 4. Preferably, the flanges of the ridge R are located in the space between the donut—halfmoon or parentheses signs.

In one of the preferred embodiments of the invention, a flux breaking the oxide layer of the metal from which the plates to be joined is manufactured may be applied to the parts to be joined. Preferably, this flux is applied to an area being situated between the areas provided with brazing material. It should be noted that a flux does not contain any particles that will keep the neighbouring plates on a distance from one another; hence, flux may be provided between the plates without departing from the scope of the invention.

It is also possible to break the oxide layer e.g. by providing a reducing atmosphere.

Application Process

In one embodiment of the invention, the brazing material is applied in the form of a paste that is applied by screen-printing. Screen-printing is a method that is well known; it comprises an impermeable screen provided with permeable areas. Application (or printing) is effected by contacting an underside of the screen with the area to be printed, after which the brazing material paste is applied to an upper side of the screen. The brazing material paste will pass the screen in the permeable areas; hence, the corresponding areas of the surface to be printed will come in contact with the brazing material, leading to those areas being coated with the brazing material, whereas the areas covered by the impermeable screen portions will not.

According to the prior art, the brazing material may be applied in a ring surrounding the contact point between the groove G of an upper heat exchanger plate and ridge R of a lower heat exchanger plate. However, tests have shown that application in a ring is not suitable if screen printing is used, since printing on the flanges of the ridge R will make it impossible, or at least very difficult, to achieve an even thickness of the brazing material due to the screen not being able to contact the flanges properly.

By applying the brazing material in a donut-shape, half moon shape, or in form of two parentheses signs partly encircling the contact point, this problem is solved, or at least mitigated, since a smaller portion of the brazing material is applied on the flanges of the ridge R if the brazing material is applied in this manner.

It should be noted that according to the disclosed method, a major leap concerning the ratio of coated/uncoated surface is achieved. According to the prior art, the percentage of coated area ranges between 5% and 40%; according to the present invention, the percentage coated area may be below 5%, while maintaining a great strength of the brazed connections.

The invention claimed is:

1. Method for brazing a plate heat exchanger comprising a stack of heat exchanger plates provided with a pressed pattern of ridges and grooves adapted to form contact points between the plates and provide for interplate flow channels for media to exchange heat, said interplate flow channels being in selective fluid communications with port openings provided near corners of the heat exchanger plates, the method including the steps of:
   i. calculating or measuring the exact position of all contact points between the ridges and grooves of neighboring plates of the stack of heat exchanger plates;
   ii. applying brazing material close to, but not at, the contact points;
   iii. stacking heat exchanger plates provided with brazing material to a stack;
   iv. placing the stack of heat exchanger plates in a furnace;
   v. heating the stack of heat exchanger plates to a temperature sufficient for melting the brazing material; and vi. allowing the stack of heat exchanger plates to cool down such that the brazing material solidifies and binds the plates together; and wherein step ii. includes screen printing the brazing material in half moon shaped or parenthesis-shaped patterns neighboring the contact point.

2. The method according to claim 1, including the further step of:

applying brazing material on skirts surrounding the heat exchanger plates and areas around the port openings that should be joined.

3. The method according to claim 1, wherein the brazing material is applied in at least one groove extending around said port opening.

4. The method according to claim 1, wherein the brazing material is applied in the form of a paste.

5. The method according to claim 1, wherein the brazing material is an iron based brazing material containing a base of stainless steel and additives of melting point depressants.

6. The method according to claim 1, wherein the brazing material is a nickel based brazing material.

7. The method according to claim 1, wherein the brazing material is a copper based brazing material.

8. The method according to claim 1, wherein the brazing material is placed such that it is in contact with both the ridges of the pressed pattern of one plate and the grooves of the pressed pattern of a neighboring plate.

9. The method of claim 1, wherein the brazing material is placed on one side of the contact point only.

10. The method of claim 1, wherein a flux is provided at the contact points between the neighboring plates.

11. The method according to claim 1, wherein the brazing operation is performed under a vacuum, a reducing or a protective atmosphere.

12. The method according to claim 1, wherein the brazing material is applied only to areas in which a gap having a height between the groove a of an upper heat exchanger plate and the ridge of a lower heat exchanger plate is larger than a grain size of the brazing material.

13. The method according to claim 1, wherein the brazing material is applied to a surface corresponding to less than 5% of an entire surface of the heat exchanger plate.

* * * * *